(12) United States Patent
Böhm et al.

(10) Patent No.: US 7,964,656 B2
(45) Date of Patent: Jun. 21, 2011

(54) METHOD OF IMPROVING CARBON BLACK DISPERSION IN RUBBER COMPOSITIONS

(75) Inventors: Georg G. A. Böhm, Akron, OH (US); Anthony J. Ramic, Brook Park, OH (US); James D. Ulmer, Akron, OH (US); William L. Hergenrother, Akron, OH (US); Christine M. Rademacher, Akron, OH (US); David F. Lawson, Uniontown, OH (US); Sunil B. Sarkar, Akron, OH (US)

(73) Assignee: Bridgestone Corporation (JP)

( * ) Notice: Subject to any disclaimer, the term of this patent is extended or adjusted under 35 U.S.C. 154(b) by 1140 days.

(21) Appl. No.: 11/701,209

(22) Filed: Feb. 1, 2007

(65) Prior Publication Data

US 2007/0135533 A1 Jun. 14, 2007

Related U.S. Application Data

(63) Continuation of application No. 10/022,108, filed on Dec. 13, 2001, now abandoned.

(51) Int. Cl.
*C08J 3/22* (2006.01)

(52) U.S. Cl. ............... 523/333; 152/209.1; 152/905; 523/351; 524/495

(58) Field of Classification Search .......... 152/209.1, 152/209.5, 905; 523/351, 333, 340; 524/495, 524/496
See application file for complete search history.

(56) References Cited

U.S. PATENT DOCUMENTS

| | | | | |
|---|---|---|---|---|
| 2,617,782 A | 11/1952 | Paton et al. | | 523/351 |
| 2,721,185 A | 10/1955 | Schulze et al. | | 524/483 |
| 3,317,458 A | 5/1967 | Clas et al. | | 523/334 |
| 3,709,958 A | 1/1973 | Burleigh | | 523/333 |
| 3,824,206 A | 7/1974 | Baranwal et al. | | 524/575 |
| 3,989,661 A * | 11/1976 | Bondy | | 523/335 |
| 4,305,851 A | 12/1981 | Tominaga et al. | | 260/5 |
| 4,561,657 A | 12/1985 | Tominaga et al. | | 273/218 |
| 4,838,556 A | 6/1989 | Sullivan | | 473/372 |
| 5,006,603 A | 4/1991 | Takaki et al. | | 525/105 |
| 5,018,740 A | 5/1991 | Sullivan | | 473/372 |
| 5,131,662 A | 7/1992 | Pollitt | | 273/230 |
| 5,227,425 A | 7/1993 | Rauline | | 524/493 |
| 5,268,439 A | 12/1993 | Hergenrother et al. | | 526/340 |
| 5,294,659 A * | 3/1994 | Kidder | | 524/458 |
| 5,332,810 A | 7/1994 | Lawson et al. | | 540/450 |
| 5,508,350 A | 4/1996 | Cadorniga et al. | | 525/193 |
| 5,697,856 A | 12/1997 | Moriyama et al. | | 473/374 |
| 5,717,022 A | 2/1998 | Beckmann et al. | | 524/493 |
| 5,719,207 A | 2/1998 | Cohen et al. | | 524/213 |
| 5,786,441 A | 7/1998 | Lawson et al. | | 528/229 |
| 5,866,171 A | 2/1999 | Kata | | 425/46 |
| 5,876,527 A | 3/1999 | Tsuruta et al. | | 152/541 |
| 5,919,862 A | 7/1999 | Rajagopalan | | 525/63 |
| 5,931,211 A | 8/1999 | Tamura | | 152/209.5 |
| 5,971,046 A | 10/1999 | Koch et al. | | 152/152.1 |
| 5,971,869 A | 10/1999 | Rajagopalan et al. | | 473/371 |
| 5,981,658 A | 11/1999 | Rajagopalan et al. | | 525/72 |
| 5,998,506 A | 12/1999 | Nesbitt | | 523/219 |
| 6,004,226 A | 12/1999 | Asakura | | 473/373 |
| 6,025,450 A | 2/2000 | Lawson et al. | | 526/340 |
| 6,046,288 A | 4/2000 | Lawson et al. | | 526/175 |
| 6,071,201 A | 6/2000 | Maruko | | 473/373 |
| 6,080,835 A | 6/2000 | Lawson et al. | | 528/396 |
| 6,334,820 B1 | 1/2002 | Sasaki | | 473/374 |
| 6,394,915 B1 | 5/2002 | Nesbitt | | 473/378 |
| 6,596,797 B2 | 7/2003 | Nesbitt | | 524/322 |
| 6,713,541 B1 * | 3/2004 | Hergenrother et al. | | 524/76 |
| 6,943,208 B2 | 9/2005 | Higuchi et al. | | 524/399 |

FOREIGN PATENT DOCUMENTS

| | | | |
|---|---|---|---|
| CA | 886611 | * | 11/1971 |
| EP | 9250 | | 4/1980 |
| EP | 0 890 606 | | 1/1999 |
| JP | 52-145486 | | 12/1977 |
| JP | 61-130357 | | 6/1986 |
| JP | 3-281642 | | 12/1991 |
| JP | 2000-063566 | * | 2/2000 |
| WO | WO 0134658 | | 5/2001 |

OTHER PUBLICATIONS

Blow, Rubber Technology and Manufacture, pp. 198-203, date: 1971.*
Machine translation for Japan 2000-063566 (no date).*
U.S. Abstract of Japanese Publication No. 2092379 by Yoshihiko.

* cited by examiner

*Primary Examiner* — Steven D Maki
(74) *Attorney, Agent, or Firm* — Meredith E. Hooker; Arthur M. Reginelli

(57) ABSTRACT

A method for forming a vulcanizable composition of matter, the method comprising providing a polymer cement or latex comprising at least one rubber, adding at least one processing aid to the cement or latex to form a modified rubber cement or latex, isolating the rubber and at least one processing aid to form a premix, and mixing the premix with carbon black.

18 Claims, No Drawings

_US 7,964,656 B2_

METHOD OF IMPROVING CARBON BLACK DISPERSION IN RUBBER COMPOSITIONS

This application is a continuation of U.S. Ser. No. 10/022,108, filed on Dec. 13, 2001, now abandoned which is incorporated herein by reference.

FIELD OF THE INVENTION

This invention relates to a process for improving carbon black dispersion within carbon black-filled rubber compositions.

BACKGROUND OF THE INVENTION

Carbon black is used as a filler within vulcanizable rubber compositions of matter that are used to make tire components and other rubber articles. The degree of carbon black dispersion within these compositions ultimately impacts the properties of the tire or other rubber articles. For example, higher dispersion results in increased abrasion resistance.

Carbon black is typically added to these rubber compositions during compounding, which is a process that includes mixing of rubber, filler, and other compound components. During mixing, processing aids have been added to improve the degree of carbon black dispersion.

Despite the use of these conventional processing aides, further improvement in carbon black dispersion is desired. This is especially true where a large volume of rubber is compounded within a large-scale mixing apparatus.

SUMMARY OF THE INVENTION

In general the present invention provides a method for forming a vulcanizable composition of matter, the method comprising providing a polymer cement or latex comprising at least one rubber, adding at least one processing aid to the cement or latex to form a modified rubber cement or latex, isolating the rubber and at least one processing aid to form a premix, and mixing the premix with carbon black.

The present invention further provides a tire tread prepared by a method comprising preparing a vulcanizable composition of matter by providing a rubber cement or latex comprising at least one rubber, adding at least one processing aid to the rubber cement or latex to form a modified rubber cement or latex, isolating the rubber and at least one processing aid to form a premix, mixing the premix with carbon black, shaping the vulcanizable composition of matter into a green tire tread, and curing the tire tread.

The present invention also provides a method for increasing the dispersion of carbon black within a carbon-black filled tire component, the method comprising providing a rubber cement or latex comprising at least one rubber, adding at least one processing aid to the rubber cement or latex to form a modified rubber cement or latex, isolating the rubber and at least one processing aid from the solvent to form a premix, and mixing the premix with carbon black.

This invention advantageously improves the dispersion of carbon black within vulcanizable compositions that are compounded in large volumes within large-scale mixing equipment. Among other advantages, this increased carbon black dispersion allows for the production of tire treads that exhibit improved wear.

DETAILED DESCRIPTION OF ILLUSTRATIVE EMBODIMENTS

The vulcanizable rubber compositions, which are useful in preparing tire components and other rubber articles, are prepared by mixing a rubber/processing aid premix with carbon black. The premix is prepared by adding at least one processing aid to a polymer cement or aqueous latex, and subsequently removing the solvent.

Polymer cements include a solution of at least one rubbery elastomer in an organic solvent. The rubbery elastomers may be dissolved or suspended in the organic solvent. The cement may also be oil extended, which refers to a rubber cement that includes one or more oils, such as aromatic and naphthenic oils, which are typically employed in the rubber industry. Aqueous lattices include suspensions of at least one rubbery elastomer. These lattices may also be oil extended.

Rubbery elastomers include natural and synthetic elastomers. The synthetic elastomers typically derive from the polymerization of conjugated diene monomers. These conjugated diene monomers may be copolymerized with other monomers such as vinyl aromatic monomers. Other rubbery elastomers may derive from the polymerization of ethylene together with one or more α-olefins and optionally one or more diene monomers.

Useful rubbery elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped.

The synthetic elastomers include functionalized elastomers. These elastomers preferably contain at least one functional group that will react or interact with a rubber filler. These functional groups may be located either at the end of the polymer chain or pendent to the polymer backbone. Those functional groups that are pendant to the polymer chain are preferably located near the end of the chain. Useful techniques for preparing functionalized elastomers are well known in the art. For example, these functional groups can be added to the polymer during synthesis of the elastomer or by grafting to the elastomer.

In one embodiment, the elastomers are synthesized by using anionic polymerization initiators that include cyclic amine groups, which impart a cyclic amine functionality to the resulting polymers. An example of these initiators includes lithio hexamethyleneimine, which is disclosed in U.S. Pat. Nos. 6,080,835; 5,786,441; 6,025,450; and 6,046,288, which are incorporated herein by reference.

In another embodiment, the elastomers are synthesized by using anionic polymerization initiators that include at least one tin atom. These compounds, such as tin-lithium initiators, are believed to incorporate a tin atom at the head of the polymer chain. An example includes tributyltin lithium, which is disclosed in U.S. Pat. No. 5,268,439, which is incorporated herein by reference.

In yet another embodiment, anionically-polymerized elastomers, whether head-functionalized or not, are terminated with a coupling agent or a terminating agent that will impart an end functionality to the polymer. Useful compounds that may be used to couple or functionalize the tail end of the living polymers include, but are not limited to, those compounds that can be defined by the formula $R_nMX_{4-n}$, where R is an organic group, M is silicon or tin, X is a halogen atom, and n is a numeral from 0 to 3. Preferably, R is a simple alkyl group having from 1 to about 10 carbon atoms. Exemplary compounds include $SnCl_4$, $R_2SnCl_2$, and $RSnCl_3$, which are disclosed in U.S. Pat. No. 5,332,810, which is incorporated herein by reference. Other compounds that may be used alone or in conjunction with the foregoing tin or silicon compounds include metal halides, metalloid halides, alkoxysilanes, imine-containing compounds, esters, ester-carboxylate metal complexes, alkyl ester carboxylate metal complexes, aldehydes or ketones, amides, isocyanates, isothiocyanates, imines, and epoxides.

In still another embodiment, elastomers synthesized with coordination catalyst systems, such as lanthanide-based catalyst systems, are terminated with a coupling agent or terminating agent that will impart an end functionality to the polymer. Useful coupling or functionalizing agents include those described above, which are described in International Application Nos. PCT/US00/30743 and PCT/US00/30875, which are incorporated herein by reference.

The rubbery elastomers generally have a number average molecular weight from about 60,000 to about 500,000 g/mol, preferably from about 100,000 to about 400,000 g/mol, and more preferably from about 120,000 to about 300,000 g/mol, as determined by using gel permeation chromatography (GPC) calibrated with polystyrene standards and adjusted for the Mark-Houwink constants for the polymer in question.

In preparing the polymer cements, suitable types of organic solvents include, but are not limited to, aliphatic, cycloaliphatic, and aromatic hydrocarbons. Some representative examples of these solvents include n-pentane, n-hexane, n-heptane, n-octane, n-nonane, n-decane, isopentane, isohexane, isoheptane, isooctane, 2,2-dimethyl butane, petroleum ether, kerosene, petroleum spirits, and isomers thereof. Some representative examples of suitable cycloaliphatic solvents include cyclopentane, cyclohexane, methylcyclopentane, methyl cyclohexane, and the like. Some representative examples of suitable aromatic solvents include benzene, toluene, xylene, ethyl benzene, diethyl benzene, mesitylene, and mixtures of aliphatic, cycloaliphatic and aromatic compounds. Commercial mixtures of the above hydrocarbons, such as hexanes, may also be used. For environmental reasons, aliphatic and cycloaliphatic solvents are highly preferred.

Preferably, the polymer cement or aqueous latex includes from about 5 to about 60 percent by weight elastomer, more preferably from about 10 to about 35 percent by weight elastomer, and even more preferably from about 15 to about 25 percent by weight elastomer.

The polymer cement may be prepared by using several techniques. In one embodiment, the cement is prepared by synthesizing elastomers within an organic solvent. In another embodiment, the cement is prepared by dissolving or suspending the elastomers within an organic solvent.

The aqueous latex can be obtained from natural sources or synthetically prepared. Synthetically, rubbery elastomers can be synthesized by well-known techniques such as emulsion polymerization. Or, one or more rubbery elastomers can be emulsified by using, for example, emulsifiers or surfactants and a high shear colloidal mill.

Processing aids include those compounds, or mixtures thereof, that aid in the dispersion of filler. Typically, these compounds improve the dispersion of filler particles, such as carbon black, within rubber compositions. They may react or interact with the filler and thereby facilitate the filler's dispersion, or they may facilitate filler incorporation and speed the attainment of filler dispersion. Useful processing aids include polar organic compounds, resins, and low-molecular weight polymers. Petroleum-derived oils, such as paraffinic, aromatic, and naphthenic oils, are preferably excluded. Those compounds having a flash-point that is less than about 125° C. are preferably excluded.

The polar organic compounds preferably include high-HLB surfactants, esters, ketones, aldehydes, ethers, amides, amines, carboxylic acids, fatty acids, sulfonic acids, organic sulfates, metal carboxylates, metal sulfonates, and mixtures thereof.

The preferred high-HLB surfactants include those compounds that have a hydrophilic-lipophilic balance (HLB) from about 3 to about 35, more preferably from about 10 to about 33, and even more preferably from about 20 to about 30. Higher HLB values correspond to greater hydrophilicity. These surfactants may be liquid or solid at room temperature. The molecular weight of these surfactants is preferably from about 100 g/mole to about 15,000 g/mole, more preferably from about 1,000 g/mole to about 14,000 g/mole and more preferably from about 5,000 g/mole to about 13,000 g/mole.

Useful high-HLB surfactants are commercially available under the tradenames Tween 20, Span 20, Span 60, and Myrj 59 (ICI Surfactants; Wilmington, Del.), and the tradenames Pluronic L35, Pluronic F38, and Pluronic F88 (BASF; Mount Olive, N.J.).

The carboxylic acids, which may be saturated or unsaturated, preferably include those containing from 2 to about 30 carbon atoms, more preferably about 5 to about 24 carbon atoms, and even more preferably about 8 to about 18 carbon atoms. Preferred acids include fatty acids, which are those carboxylic acids that are obtained from natural sources.

Useful acids include stearic acid, lauric acid, palmitic acid, oleic acid, myristic acid, and linoleic acid.

The sulfonic acids include those compounds that include one or more sulfonic acid groups ($SO_2OH$) that are attached to a carbon atom of a hydrocarbyl group.

Exemplary types of sulfonic acids include alkylsulfonic acids, alkylbenzenesulfonic acids, and alkylnaphthalenesulfonic acids. Useful sulfonic acids include octylsulfonic acid, dodecylbenzenesulfonic acid, and dodecylnaphthenesulfonic acid.

The carboxylates, which may also be referred to as organic salts, preferably include alkali metals such as sodium and potassium, alkaline-earth metals such as magnesium and calcium, or transition metals such as iron, nickel, and zinc. The hydrocarbon portion of these carboxylates preferably derives from carboxylic acids, which may be saturated or unsaturated, that include from about 4 to about 40 carbon atoms, more preferably from about 6 to about 30 carbon atoms, and most preferably from about 8 to about 24 carbon atoms. These hydrocarbons are preferably aliphatic, and even more preferably saturated. In one embodiment, the hydrocarbon derives from a fatty acid, examples of which are described above.

Examples of organic salts include sodium stearate, sodium myristate, sodium laurate, sodium palmitate, sodium oleate, sodium linoleate, calcium stearate, calcium myristate, calcium laurate, calcium palmitate, calcium oleate, sodium myristate, zinc stearate, zinc myristate, zinc laurate, zinc palmitate, zinc oleate, and zinc linoleate.

Useful organic salts are commercially available under the tradename AKROCHEM PROAID 9810 (Akrochem; Akron, Ohio), NORAC Calcium Stearate (Sovereign Chemical Co.; Akron, Ohio), COAD 10, 20, 23, LM, which are calcium stearate, zinc stearate, zinc stearate, and calcium stearate salts, respectively (Sovereign Chemical Co.), MAXIFLOW RS and SP (Rubber Service; Argentina), STRUKTOL A50, A91F, and EF44A, which are zinc soaps of various fatty acids (Struktol; Stow, Ohio). Blends of fatty acids together with esters are also commercially available under the tradename STRUKTOL WA48 and WB16 (Struktol).

In a preferred embodiment, blends of zinc carboxylates are employed. These blends may include mixtures of carboxylates that are distinguished based upon the configuration of the hydrocarbon or the size of the hydrocarbon. These blends preferably include mixtures of various zinc fatty acid salts.

Useful blends of zinc carboxylates are commercially available under the tradename Aktiplast GT (Rhein Chemie Corp; Trenton, N.J.), which are zinc fatty acid salts.

The metal sulfonates preferably include alkali metals such as sodium and potassium, alkaline-earth metals such as magnesium and calcium, or transition metals such as iron, nickel, and zinc. The hydrocarbon portion of these carboxylates preferably derives form sulfonic acids that include from about 4 to about 40 carbon atoms, more preferably from about 6 to about 30 carbon atoms, and most preferably from about 8 to about 24 carbon atoms. These hydrocarbons are preferably aliphatic, and even more preferably saturated.

Useful types of metal sulfonates include sodium, calcium or zinc alkyl sulfonate, alkylbenzenesulfonate, and alkylnaphthalene sulfonate.

Organic sulfates are metal salts of the reaction product of sulfuric acid and an alcohol. Alkali metals, alkaline-earth metals, and transition metals may be employed to form the salt. The alcohol preferably includes from about 2 to 30 carbon atoms and more preferably from about 6 to about 20 carbon atoms.

Examples of organic sulfates include sodium laurylsulfate, calcium stearyl sulfate, zinc oleyl sulfate, and sodium dodecylbenzenesulfonate.

Useful low molecular weight polymers include those polymers that preferably have a number average molecular weight from about 1,000 g/mol to about 60,000 g/mol, more preferably from about 2,000 g/mol to about 50,000 g/mol, and even more preferably from about 3,000 g/mol to about 45,000 g/mol.

Preferred polymers derive from the polymerization of alpha-olefins, dienes, conjugated dienes, fluorine-containing monomers, or combinations thereof. Examples of useful low-molecular weight polymers include polyethylene, polypropylene, polybutene, polybutylene, ethylene-propylene rubber, ethylene-propylene-diene rubber, polytetrafluoroethylene, polyisoprene, and depolymerized natural rubber.

Resins generally refer to those compounds that will self-react to form larger compounds. Many of these compounds are low-melting temperature solids.

Exemplary resins include pine tar resins, low molecular weight unsaturated polyesters, phenol formaldehyde, and melamine formaldehyde.

The premix is formed by adding at least one processing aid to the polymer cement or aqueous latex, which thereby forms a modified polymer cement or latex, and subsequently isolating the rubbery elastomer and processing aid from the solvent of the cement or latex. The addition of the processing aid can occur by employing several techniques. In one embodiment, the processing aid is added directly to the cement or latex. In another embodiment, the processing aid is added to the cement or latex via a cocktail. Once the processing aid is added to the cement or latex to form the modified polymer cement, the modified polymer cement or latex may be mixed or agitated. The polymer and processing aid are then isolated from the solvent and optionally dried to form the premix.

In one embodiment, the cocktail is a blend of an organic solvent and a processing aid. Additional ingredients that may be added to this cocktail include antioxidants and oils, which include plasticizers, extender oils, and synthetic oils. Useful organic solvents are described above. The preferred solvent includes commercial cyclohexanes, commercial hexanes, or a blend of commercial cyclohexanes and hexanes.

In another embodiment, the cocktail is a blend of a processing oil and a processing aid. Preferred processing oils include those oils that are typically employed to extend cements of rubbery elastomers. These oils include paraffinic, aromatic and naphthenic oils.

Where the cocktail includes a solvent, a processing aid, and optional oil, the cocktail preferably includes from about 10 to about 50 parts by weight processing aid, from about 100 to about 35 parts by weight solvent, and from about 0 to about 65 parts by weight oil, where the solvent and oil total 100 parts by weight. More preferably, the cocktail includes from about 15 to about 45 parts by weight processing aid, from about 95 to about 45 parts by weight solvent, and from about 5 to about 55 parts by weight oil, where the solvent and oil total 100 parts by weight.

Where the cocktail includes a processing aid and oil, the cocktail preferably includes from about 15 to about 55, and more preferably from about 20 to about 45 parts by weight processing aid per 100 parts by weight oil.

The cocktail is prepared by combining and preferably mixing the ingredients. This step of combining preferably occurs at a temperature from about 30 to about 140° C., more preferably from about 40 to about 130° C., and even more preferably from about 50 to about 120° C. Mixing is preferably continued until the processing aid is homogenized within the solvent and optional oil.

The cocktail is preferably added to the polymer cement while the polymer cement is undergoing agitation. Preferably, the polymer cement is at a temperature of about 30 to about 120° C., more preferably from about 40 to about 110° C., and even more preferably from about 50 to about 100° C. The cocktail is also preferably maintained within these temperature ranges during the addition process.

The amount of processing aid added to the polymer cement or latex is generally from about 0.1 to about 15 phr, preferably from about 0.5 to about 12 phr, more preferably from about 1.0 to about 10 phr, still more preferably from about 1.2 to about 8 phr, and still more preferably from about 1.5 to about 5 phr, where phr refers to the parts by weight of ingredient, i.e., processing aid, per 100 parts by weight rubber.

After formation of the modified polymer cement or latex, the rubbery elastomer, the processing aid, and other optional additives such as oil, are isolated from the solvent and preferably dried. This isolated composition may be referred to as the rubber/processing aid premix or simply premix. Conventional procedures for desolventization and drying may be employed. In one embodiment, where a polymer cement is employed, the premix may be isolated from the solvent by steam distillation of the solvent followed by filtration. Residual solvent may be removed by drying the rubber/processing aid masterbatch by using conventional drying techniques such as a drum dryer. Alternatively, the rubber-modified cement may be directly drum dried to produce the premix. In another embodiment, where an aqueous latex is employed, the premix can be isolated by coagulation, which is a technique that is known in the art. These techniques may employ compounds such as calcium chloride or other salts that serve to destabilize the emulsion.

In preparing the vulcanizable compositions of matter, the rubber/processing aid premix and at least one filler are combined and mixed or compounded. Other ingredients that are typically employed in rubber compounding may also be added.

The rubber compositions may include fillers such as inorganic and organic fillers. The organic fillers include carbon black. The inorganic fillers may include silica, aluminum hydroxide, magnesium hydroxide, clays (hydrated aluminum silicates), and mixtures thereof.

A multitude of rubber curing agents may be employed. For example, sulfur or peroxide-based curing systems may be employed. Also, see Kirk-Othmer, ENCYCLOPEDIA OF CHEMICAL TECHNOLOGY, 3$^{rd}$ Edition, Wiley Interscience, N.Y. 1982, Vol. 20, pp. 365-468, particularly VULCANIZATION AGENTS AND AUXILIARY MATERIALS pp. 390-402, or *Vulcanization* by A. Y. Coran, ENCYCLOPEDIA OF POLYMER SCIENCE AND ENGINEERING, 2$^{nd}$ Edition, John Wiley & Sons, Inc., 1989, which are incorporated herein by reference. Vulcanizing agents may be used alone or in combination.

Other ingredients that may be employed include accelerators, oils, waxes, scorch inhibiting agents, processing aids, zinc oxide, tackifying resins, reinforcing resins, fatty acids such as stearic acid, peptizers, and one or more additional rubbers.

Fillers are typically employed in an amount from about 1 to about 100 phr, and preferably from about 20 to about 90 phr, and more preferably from about 35 to about 80 phr, where phr refers to parts by weight ingredient per 100 parts by weight rubber within the compound, which may include the rubber within the premix as well as any additional rubber that may be added during compounding.

The vulcanizable compositions of matter prepared according to this invention are mixed in conventional large-scale mixing equipment. This equipment is generally characterized by having a net mixing chamber volume of at least about 75 L, advantageously at least about 270 L, and more advantageously at least about to 620 L. Examples of these mixers include Banbury mixers. Typically, these mixers operate at a fill factor of at least about 50, advantageously at least about 60, and more advantageously at least about 70.

Preferably, the vulcanizable rubber composition is prepared by forming an initial masterbatch that includes the premix and filler. This initial masterbatch is mixed at a starting temperature of from about 25° C. to about 100° C. with a discharge temperature of about 135° C. to about 180° C. To prevent premature vulcanization (also known as scorch), this initial masterbatch generally excludes any vulcanizing agents. Once the initial masterbatch is processed, the vulcanizing agents are introduced and blended into the initial masterbatch at low temperatures in a final mix stage, which does not initiate the vulcanization process. Optionally, additional mixing stages, sometimes called remills, can be employed between the masterbatch mix stage and the final mix stage. Rubber compounding techniques and the additives employed therein are generally known as disclosed in the in *The Compounding and Vulcanization of Rubber*, by Stevens in RUBBER TECHNOLOGY SECOND EDITION (1973 Van Nostrand Reinhold Company). The mixing conditions and procedures applicable to silica-filled tire formulations are also well known as described in U.S. Pat. Nos. 5,227,425; 5,719,207; 5,717,022, as well as EP 0890606, all of which are incorporated herein by reference.

Where the vulcanizable rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it is heated to about 170° C. Cured or crosslinked rubber compositions may be referred to as vulcanizates, which generally contain three-dimensional polymeric networks that are thermoset. The other ingredients, such as processing aides and fillers, are generally evenly dispersed throughout the vulcanized network. Tire components of this invention preferably include tire treads. The rubber compositions, however, can also be used to form other elastomeric tire components such as subtreads, sidewalls, body ply skims, bead fillers and the like. Pneumatic tires can be made as discussed in U.S. Pat. Nos. 5,866,171; 5,876,527; 5,931,211; and 5,971,046, which are incorporated herein by reference.

The vulcanizable rubber compositions prepared according to this invention may also be employed in the manufacture of other rubber articles. For example, they may be employed in the manufacture of rubber air springs, which are vibration damping devices that are typically employed in trucks. They may also be employed in manufacture of rubber sheeting and other articles that are employed in preparing roofing materials.

In order to demonstrate the practice of the present invention, the following examples have been prepared and tested. The examples should not, however, be viewed as limiting the scope of the invention. The claims will serve to define the invention.

EXAMPLES

Experiment I

Two rubber formulations were prepared according to the recipe in Table I.

TABLE I

| | Formulation | |
|---|---|---|
| | A | B |
| Masterbatch Ingredients | | |
| Functionalized and oil-extended poly(styrene-co-butadiene) | 77.42 | — |
| Functionalized and oil-extended poly(styrene-co-butadiene)/processing aid premix | — | 80.5 |
| Natural Rubber | 30.00 | 30.00 |
| Carbon Black | 41.00 | 41.00 |
| Wax | 1.00 | 1.00 |
| Antiozonant | 0.95 | 0.95 |
| Zinc Oxide | 2.50 | 2.50 |
| Stearic Acid | 2.00 | 2.00 |
| Processing Aid | 3.00 | — |
| Final Mix Ingredients | | |
| Sulfur | 1.30 | 1.30 |
| N,N-Dicyclohexyl-2-benzothiazole sulfonamide | 1.70 | 1.70 |
| N,N-Diphenyl guanidine | 0.20 | 0.20 |

These formulations were mixed in a Banbury internal mixer having a net mixing chamber volume of about 75 L loaded to a fill factor of about 70.

The oil-extended functionalized poly(styrene-co-butadiene) was prepared by polymerizing styrene and butadiene monomer with hexamethyleneimine as an initiator in the presence of hexanes and terminated with a mixture of tributyltin chloride and tin tetrachloride as described in U.S. Pat. No. 5,332,810. The polymer was characterized by having about 27% by weight styrene content and a glass transition temperature of about −46° C. The polymer was oil extended by using an aromatic process oil to achieve 7.42 parts by weight oil and 70 parts by weight polymer. The processing aid was a mixture of zinc fatty acid salts obtained under the tradename Aktiplast GT (Rhein Chemie).

In preparing formulation A, the processing aid was added directly to the masterbatch during initial mixing within the Banbury mixer. In other words, it was added during solid-state mixing. In preparing formulation B, the processing aid was not added during solid state mixing. Instead, a premix was prepared according to the practice of this invention. Specifically, a cocktail containing 12% by weight zinc fatty acid salts was prepared by adding Aktiplast GT (Rhein Chemie) to cyclohexanes and heated to about 66° C. This cocktail, which was maintained at about 66° C., was then added to a cement of the oil-extended functionalized poly(styrene-co-butadiene) in hexanes. This cement contained about 1.7% by weight oil and about 15.7% by weight polymer, with the remainder being commercial hexanes. The resultant modified cement, at about 60-95° C., was agitated and directly drum dried to form the premix, which contained about 4.3 parts by weight of the zinc fatty acid salts, about 10.7 parts by weight oil, and 100 parts by weight rubber.

The mixing included three stages as set forth in Table II.

TABLE II

| | Step | | | |
|---|---|---|---|---|
| | 1 | 2 | 3 | 4 |
| Masterbatch | | | | |
| Chamber Temp. (° C.) | 66-68 | — | 165 | 165-168 |
| Circulating Water Temp. (° C.) | 66 | 66 | 66 | 66 |
| Rotor Speed (RPM) | 65 | 65 | 65 | 65 |
| Cumulative Mix Time (sec) | 0 | 30 | — | ~99-105 |
| Action | Add polymers, carbon black, pigments | Add stearic acid | Mix to 165° C. | Drop batch |
| Remill | | | | |
| Chamber Temp. (° C.) | 53-60 | 135 | 135-138 | — |
| Circulating Water Temp. (° C.) | 43 | 43 | 43 | — |
| Rotor Speed (RPM) | 60 | 60 | 60 | — |
| Cumulative Mix Time (sec) | 0 | — | ~62-72 | — |
| Action | Add masterbatch stock | Mix to 135° C. | Drop batch | — |
| Final | | | | |
| Chamber Temp. (° C.) | 43-49 | 93 | 93-96 | — |
| Circulating Water Temp. (° C.) | 43 | 43 | 43 | — |
| Rotor Speed (RPM) | 40 | 40 | 40 | — |
| Cumulative Mix Time (sec) | 0 | — | ~67-78 | — |
| Action | Add remill stock and curatives | Mix to 93° C. | Drop batch | — |

The final mix or compound was analyzed for Mooney Scorch according to ASTM D 1646 (1999). The compounds were also analyzed for Mooney Viscosity ($ML_{1+4}$ @ 130° C.). The results of these tests are set forth in Table III.

Test specimens of each rubber formulation were prepared by cutting out the required mass from an uncured sheet (about 2.5 mm to 3.81 mm thick). Test specimens were cured within closed cavity molds under pressure for 13 minutes at 165° C. Modulus at 300% and tensile strength were measured according to ASTM D 412 (1998) Method B, where samples were died from a cured sheet about 1.8 mm thick. Rubber cylinders measuring about 9.5 mm in diameter and 16 mm high were analyzed by using a Dynastat viscoelastic analyzer and an RDA (Reometrics Dynamic Analyzer). Dynastat M', RDA G', and Dynastat tan δ are reported in Table III. Carbon black dispersion (Surfanalyzer Dispersion Index) was measured according to ASTM D 2663, Test Method C (1995), except that the same calibration values, A and B, were used for all test samples with periodic review of the calculated dispersion ratings relative to dispersion estimates from light optical microscopy. Where carbon black dispersion was measured for the masterbatch stage or the remill stage, the test specimens were cured by using electron beam irradiation. Test specimens formed into rubber wheels of about 48 mm in outside diameter, about 22 mm in inside diameter, and about 4.8 mm in thickness were subjected to the Lambourn abrasion test, with Formulation A as the control. Pendulum rebound was analyzed by employing a Zwick Rebound Resilience Tester (Zwick). The results of the foregoing tests are reported in Table III.

TABLE III

| Property | A | B |
|---|---|---|
| Surfanalyzer Dispersion Index (Masterbatch Stage) | 43.5 | 59.6 |
| Surfanalyzer Dispersion Index (Remill Stage) | 54.1 | 71.7 |
| Surfanalyzer Dispersion Index (Final Stage) | 52.8 | 76.3 |
| Mooney Viscosity ($ML_{1+4}$ @ 130° C.) | 56.8 | 58.9 |
| Mooney Scorch Time (min.) | 20.0 | 20.4 |
| Modulus @ 300% (23° C.) (MPa) | 9.053 | 8.778 |
| Tensile Strength @ 23° C. (MPa) | 14.81 | 14.55 |
| Elongation @ Break (%) | 400 | 403 |
| Pendulum Rebound @ 50° C. (%) | 69.2 | 69.2 |
| Lambourn Abrasion Resistance Index | 100.0 | 109.6 |
| Dynastat M' @ 25° C. (MPa) | 6.26 | 6.14 |
| Dynastat tan δ @ 50° C. | 0.090 | 0.092 |
| 25° C. RDA G' @ 14% Strain (MPa) | 1.84 | 1.82 |

Various modifications and alterations that do not depart from the scope and spirit of this invention will become apparent to those skilled in the art. This invention is not to be duly limited to the illustrative embodiments set forth herein.

What is claimed is:

1. A method for forming a vulcanizable composition of matter, the method comprising:
    (i) providing a polymer cement comprising at least one functionalized rubber, where the functionalized rubber includes an amine or tin functionality;
    (ii) preparing a cocktail by mixing about 15 to 45 parts by weight of a processing aid, about 5 to 55 parts by weight of an oil, and from about 95 to 45 parts by weight of a solvent, where the processing aid is a mixture of zinc fatty acid salts, or a high-HLB surfactant, or a metal sulfonate;

(iii) adding the cocktail to the cement to form a modified polymer cement or latex;

(iv) isolating from the modified rubber cement the rubber and at least one processing aid to form a premix; and (v) mixing the premix with carbon black to form a vulcanizable composition, where said step of mixing occurs within a mixer having a net mixing chamber volume of at least about 75 L operated at a fill factor of at least about 50.

2. The method of claim 1, where said step of isolating includes drying the rubber and processing aid.

3. The method of claim 1, where the processing aid is a mixture of zinc fatty acid salts.

4. The method of claim 1, where the processing aid is a high-HLB surfactant.

5. The method of claim 1, where the processing aid is a metal sulfonate.

6. The method of claim 1, where the functionalized rubber is prepared by anionically polymerizing conjugated dienes, alone or in combination with vinyl aromatic monomers, and where the polymerization is initiated with a cyclic amine initiator or a tin-lithio initiator.

7. The method of claim 6, where the functionalized rubber is prepared by terminating a polymerization with a coupling or functional terminating agent.

8. The method of claim 1, further comprising the step of shaping the vulcanizable composition of matter into a green tire component, and further comprising the step of curing the tire component.

9. A method for forming a vulcanizable composition of matter, the method comprising:

(i) providing a polymer cement, which includes a polymeric component dissolved in a solvent, where the polymeric component consists essentially of one or more rubber polymers and includes a functionalized rubber polymer, where the one or more rubber polymers are characterized by a number average molecular weight of from about 120,000 to about 300,000 g/mol as determined by using gel permeation chromatography calibrated with polystyrene standards and adjusted for the Mark-Houwink constants for the polymer in question;

(ii) adding at least one processing aid to the cement, where the processing aid includes a polar organic compound selected from the group consisting of high-HLB surfactant characterized by an HLB of from about 3 to about 35, and a molecular weight of from about 100 g/mole to about 15,000 g/mole;

(iii) isolating the rubber and at least one processing aid from the cement to form a premix; and (iv) solid-state mixing the premix with carbon black.

10. The method of claim 9, where the polar organic compound is characterized by an HLB of from about 10 to about 33.

11. The method of claim 10, where the polar organic compound is characterized by an HLB of from about 20 to about 30.

12. The method of claim 11, where the polar organic compound is characterized by a molecular weight of from about 5,000 g/mole to about 13,000 g/mole.

13. The method of claim 12, where said step of mixing occurs within a mixer having a net mixing chamber volume of at least about 75 L operated at a fill factor of at least about 50.

14. The method of claim 12, where the functionalized rubber polymer is a poly(styrene-co-butadiene) functionalized copolymer.

15. The method of claim 10, where the polar organic compound is characterized by a molecular weight of from about 1,000 g/mole to about 14,000 g/mole.

16. The method of claim 15, where the polar organic compound is a metal carboxylate, and where the metal carboxylate includes a mixture of zinc fatty acid salts.

17. The method of claim 9, where said step of adding at least one processing aid includes adding from about 0.1 to about 15 parts by weight processing aid per 100 parts by weight rubber.

18. A method for forming a vulcanizable composition of matter, the method comprising:

(i) providing a polymer cement, which includes a polymeric component dissolved in a solvent, where the polymeric component consists essentially of one or more rubber polymers and includes a functionalized rubber polymer, where the one or more rubber polymers are characterized by a number average molecular weight of from about 120,000 to about 300,000 g/mol as determined by using gel permeation chromatography calibrated with polystyrene standards and adjusted for the Mark-Houwink constants for the polymer in question;

(ii) adding at least one processing aid to the cement, where the processing aid includes a blend of zinc fatty acid salts;

(iii) isolating the rubber and at least one processing aid from the cement to form a premix; and (iv) solid-state mixing the premix with carbon black.

* * * * *